(12) United States Patent
De et al.

(10) Patent No.: US 9,529,948 B2
(45) Date of Patent: Dec. 27, 2016

(54) MINIMIZING CROSSOVER PATHS FOR FUNCTIONAL VERIFICATION OF A CIRCUIT DESCRIPTION

(71) Applicant: Synopsys, Inc., Mountain View, CA (US)

(72) Inventors: Kaushik De, Bangalore (IN); Mahantesh Narwade, Bangalore (IN); Rajarshi Mukherjee, Bangalore (IN); Namit Gupta, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 100 days.

(21) Appl. No.: 14/529,048

(22) Filed: Oct. 30, 2014

(65) Prior Publication Data

US 2015/0121326 A1 Apr. 30, 2015

(30) Foreign Application Priority Data

Oct. 31, 2013 (EP) ..................................... 13191109

(51) Int. Cl.
*G06F 9/455* (2006.01)
*G06F 17/50* (2006.01)

(52) U.S. Cl.
CPC ....... *G06F 17/5045* (2013.01); *G06F 17/5031* (2013.01); *G06F 2217/78* (2013.01)

(58) Field of Classification Search
None
See application file for complete search history.

(56) References Cited

PUBLICATIONS

Carver, S. et al., "Low-Power Design Using the Si2 Common Power Format," IEEE Design & Test of Computers, IEEE, Apr. 2012, pp. 62-70, vol. 29, No. 2.
Fangaria, P., "Mixed-Signal SoC Verification has Integrated Solution," The Semiconductor Wiki Project, Mar. 21, 2013, pp. 1-3, [Online] [Retrieved on Apr. 25, 2014] Retrieved from the Internet<URL:http://www.semiwiki.com/forum/content/2155-mixed-signal-soc-verification-has-integrated-solution.html>.
Kapoor, B. et al., "Tutorial: SoC Power Management Verification and Testing Issues," Ninth International Workshop on Microprocessor Test and Verification, MTV '08, IEEE, Dec. 8, 2008, pp. 67-72.

*Primary Examiner* — Bryce Aisaka
(74) *Attorney, Agent, or Firm* — Fenwick & West LLP

(57) ABSTRACT

A method for functional verification of a circuit description comprises generating a first set of crossover paths based on the circuit description, generating a low power information based on a power design description associated with the circuit description, the low power information determining a set of power state combinations, and generating a second set of crossover paths based on the first set of crossover paths and the low power information, the second set of crossover paths being a subset of the first set of crossover paths. Each of the second set of crossover paths is evaluated to identify circuit description errors, in particular functional circuit description errors.

30 Claims, 5 Drawing Sheets

MINIMIZING CROSSOVER PATHS FOR FUNCTIONAL VERIFICATION OF A CIRCUIT DESCRIPTION

CROSS REFERENCE TO RELATED APPLICATIONS

This application claims the right of priority under 35 U.S.C. §119(a) of European Patent Application No. 13191109.1, filed on Oct. 31, 2013, which is incorporated by reference in its entirety.

BACKGROUND

1. Field of Art

This disclosure relates to the art of electronic design automation (EDA), and more specifically to an automated design process and chip description system.

2. Description of the Related Art

Battery life is a critical factor for success of a mobile product. Hence every silicon chip now provides low power functionality as a method to extend the battery life. Low power functionality may be provided in practice by shutting down part of the chip to save leakage power and designing the chip to have multiple voltage domains where different domains can operate at different power states to provide either performance (at the price of high power consumption) or low power consumption (with a lower level of performance).

When a chip has multiple functional blocks, many of the blocks can be switched off or while other blocks can be powered at a variety of different power levels. Clearly, at any instance, the number of possible combinations of different functional blocks turning off or transitioning to a voltage state can be very large in modern chips.

Since defects in the low power functionality can cause chips to malfunction, every chip need to be verified to ensure that for all possible power states (that is, the combination of functional blocks switched off or set to a low voltage state) to ensure that the chip behaves correctly. One way to perform the verification is to identify all of the circuit paths in a chip which are involved in crossing from one power domain. The actual verification process includes verifying that the circuit paths function correctly for all possible combinations of voltage states for each power domain. However, in some circuit configurations, functional errors may be indicated for crossover paths for voltage state combinations that do not occur during operation of the final circuit. Hence, the unnecessary analysis of such crossover paths, with each path having large number of elements will be expensive in terms of runtime and misleading to the users, increasing verification effort.

What is needed is an improved concept for performing a functional verification of a circuit description that reduces verification effort.

SUMMARY

Such an improved concept is achieved with the subject-matter of the independent claims. Developments and embodiments are subject-matter of the dependent claims.

Signal paths that cross various power domains are defined by a circuit description and a power design description e.g. defined according to the unified power format, UPF, or the common power format, CPF. The improved concept is based on the idea that several of such signal paths crossing the power domains may be structurally present, but not functionally possible because of predefined power state combinations that exclude such paths from the theoretically possible number of power state combinations. Such signal paths can also be called crossover paths. Hence, a full set of such crossover paths is logically combined with the predefined set of power state combinations in order to generate a subset of crossover paths being both structurally and functionally present. A functional evaluation is performed on this reduced number of crossover paths of this subset. Hence, less evaluation time and effort is needed by the automatic functional evaluation. As a consequence, no false circuit description errors are found for the excluded crossover paths. A manual evaluation of these false errors can be avoided, further reducing the verification effort.

According to the improved concept, at least two cases for evaluation may be distinguished. In one case a structural pattern is identified to detect a synchronizer. Even in this case, if there exists a power state combination which all components are not ON together, then that structure is not a valid synchronizer, even if the structure is correct. In a second case, structural paths of the circuit description are identified, which are not possible due to power state combinations.

Hence, the improved concept of analysis suggests eliminating paths that happen to be structurally correct but functionally impossible. Eliminating those paths saves time in checking. In contrast to conventional approaches, no simulation of the circuit description is performed but a static analysis, which is faster and more efficient than simulation.

According to one embodiment of the improved concept, a method for functional verification of a circuit description comprises generating a first set of crossover paths based on the circuit description. A low power information is generated based on a power design description associated with the circuit description. The low power information determines a set of power state combinations. A second set of crossover paths is generated based on the first set of crossover paths and the low power information, wherein the second set of crossover paths is a subset of the first set of crossover paths. Each path of the second set of crossover paths is evaluated to identify circuit description errors, in particular functional circuit description errors.

A power state defines a power level of a certain power domain or voltage domain, for example, whether the power domain is switched on or off. The set of power state combinations determined by the low power information preferably determines which combinations of power states of the power domains are valid during intended operation of the circuit described by the circuit description. In particular, the set of valid power state combinations is smaller than the set of all theoretically possible power state combinations.

For example, circuit elements of each crossover path are assigned to one power domain of a set of available power domains being determined by the power design description. Each element of the set of power state combinations determines an allowed combination of switching states of power domains belonging to the set or to a subset of the set of available power domains.

In some implementations, the second set is generated such that a crossover path from the first set is not included in the second set if a power domain comprising a root node or a sink node of the respective crossover paths is switched off in any of the allowed combinations of switching states of power domains. For example, if either a source or a destination is switched off in any of the allowed power state combinations, no functional signal path between these two power domains exists during intended operation of the circuit. Hence, such a path can be excluded from the evaluation.

In addition, or as an alternative, the second set may be generated such that a crossover path from the first set is included in the second set if a power domain comprising a root node of the respective crossover path and a power domain comprising a sink node of the respective crossover path are both switched on in at least one of the allowed combinations of switching states of power domains. For example, if both source and destination of a signal path may be switched on concurrently during intended operation of the circuit, evaluation of that path is necessary, such that the respective crossover path is included in the second set for evaluation.

According to the implementations described above, the second set may be generated such that all crossover paths of the second set of crossover paths are functional in at least one of the allowed combinations of switching states of power domains. For example, "functional" defines that some kind of signals may be sent over the crossover path during intended operation of the circuit described by the circuit description.

Preferably, generating the second set of crossover paths is performed as a static analysis. For example, generating the second set of crossover paths is performed without simulation.

In various implementations, at least a portion of the crossover paths are clock domain crossing paths. In various digital applications logical signals are transferred between different clock domains. For example, heterogeneous, asymmetric or asynchronous multicore processors are designed, which often use clock domain crossing due to such asynchronous clock domains.

Accordingly, in these implementations, the first and the second set of crossover paths become a first and a second set of clock domain crossing paths.

Preferably, the evaluating step in this implementation comprises evaluating, for each of the second set of clock domain crossover paths, whether each power domain comprising a clock synchronizing element between a root node and a sink node of the respective clock domain crossover path is switched on for each of the allowed combinations of switching states of power domains, wherein the power domains comprising said root node and said sink node are both switched on. Hence, any invalid clock domain crossing synchronizer which is not active in all relevant power states, respectively in the set of power state combinations, will be identified and preferably reported as an illegal synchronizer.

In addition, or as an alternative, at least a portion of the crossover paths are timing paths. Such timing paths are generated to determine whether a signal propagation time over the timing path from source to destination fulfils given requirements. For example, the first and the second set of crossover paths become a first and a second set of timing paths.

For example, in such implementations the evaluating step comprises performing, for each of the second set of timing paths, a timing analysis analyzing whether a propagation time between a source node of the respective timing path and a destination node of the respective timing path is shorter than a predetermined time for each of the allowed combinations of switching states of power domains where the power domains comprising said source node and said destination node are both switched on. For example, the predetermined time is equal to or derived from a clock period of a clock signal at said source node or at said destination node. However, the predetermined time can also be a clock period of a general clock signal of the intended circuit.

More generally speaking, in the implementations described above, the evaluating step comprises evaluating, for each of the second set of crossover paths, the circuit functions of selected circuit elements of the respective paths for at least one of a selected plurality of circuit parameters and identifying functional errors in the circuit description based on the evaluation.

Preferably, identifying functional errors comprises providing a set of rules and evaluating the circuit functions of the selected circuit elements to at least one of the rules in the set of rules for each of the plurality of circuit parameters.

In various embodiments, identified circuit description errors or functional errors may be displayed, for example in order to enable a correction of the circuit design.

In the embodiments described above the various crossover paths may be created from a register transfer level, RTL, description, from a hardware description language, HDL, description, from a net list description, in particular a placed and routed net list description. Preferably, the circuit description errors to be identified are functional violations of the circuit description.

The various embodiments described above may be implemented as a computer program product. For example, an embodiment of a computer program product comprises a code that is configured to implement a method according to one of the embodiments described above.

According to the improved concept, a data carrier may comprise such a computer program product being configured to implement one of the verification methods described above.

In another embodiment according to the improved concept, a system for verification of a circuit description for evaluation purposes, in particular functional error evaluation purposes is disclosed. The system has a processor being adapted to minimize a number of crossover paths by evaluating a power design description. Therein the minimizing is performed according to one of the implementations of the functional verification method described above.

BRIEF DESCRIPTION OF THE DRAWINGS

The disclosed configurations will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the claims below. Thus, the disclosure is not intended to be limited to the embodiments shown, but is to be accorded the widest scope consistent with the claims and the description. For ease of understanding the description, it is noted that a Logic Gate is the smallest building blocks in technology libraries using which the design is built. They are for instance gates like buffer, inverter, AND gates, OR gates, flip-flops, latches, etc. A Complex Gate includes a logic gate which is not buffer, inverter, isolation cell or level-shifter cell.

Logic Blocks are design elements created by logic designers using Logic Gates and interconnections. A design is comprised of combinations and interconnection of Logic Blocks. Logic Ports are points through which Logic Blocks send or receive signals from other Logic Blocks. Voltage island or voltage domain is a partition of the design which derives its power supply from a source not shared with another partition. Such a partition influences the interaction of electrical signals in a voltage island with those of another or among themselves. Such a partition also influences the stability of operation of a voltage island as voltage control is exercised. By way of illustration, the design may include a plurality of logic blocks whose power can go off when other blocks are on, or can be driven by different voltages at different times during operations. When a group of Logic Blocks are defined as a power domain, all Logic Blocks contained by the group belong to the same power domain, unless otherwise specified.

Continuing on, a Voltage/Power State includes the state of a set of voltage islands or voltage domains at a point in time. A Power Domain Boundary Port includes a logic port on a Logic Block, which constitutes a power domain transition between different voltage domains or power domains. A SoC is System on a Chip that is a complex chip or Integrated Circuit (IC) with varied circuit types in it. In addition, Tools are generally programs that accomplish or aid the automation of design tasks, for example, electronic design automation (EDA) tools or scripts that are used for integrated circuit (IC) design tasks.

Overall Design Process Flow

Figure 1:
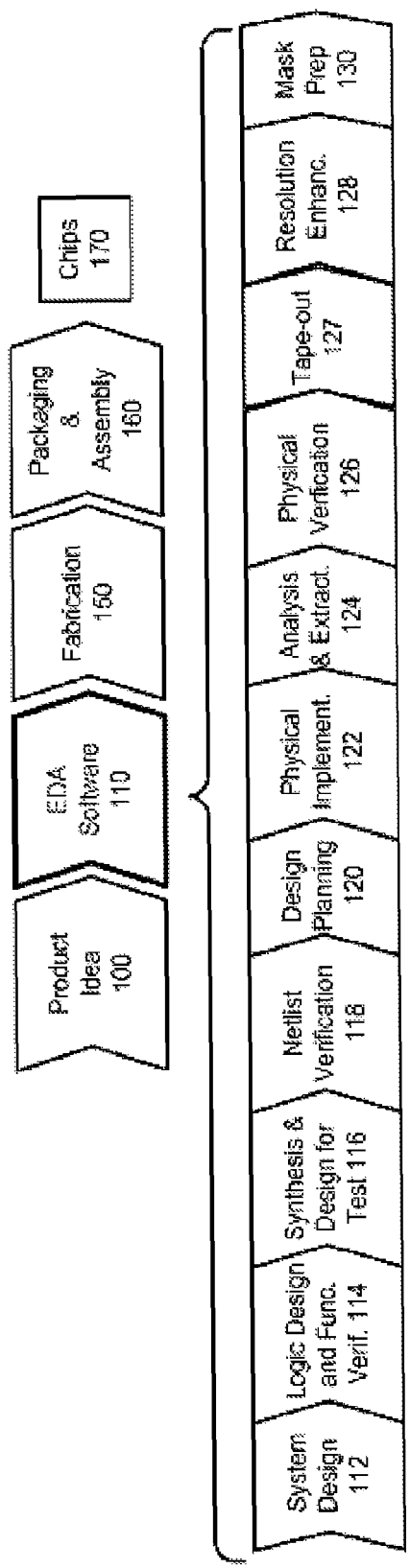
FIG. 1 shows a simplified representation of an illustrative digital integrated circuit design flow.

Turning now to Figure (FIG. 1, it shows an example representation of an illustrative digital integrated circuit design flow. At a high level, the process starts with the product idea (step 100) and is realized in an EDA (Electronic Design Automation) software design process (step 110). When the design is finalized, it can be taped-out (step 127). At some point after tape out, the fabrication process (step 150) and packaging and assembly processes (step 160) occur, resulting ultimately in finished integrated circuit chips (result 170).

The EDA software design process (step 110) is itself composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) will now be provided. In system design (step 112), the designers describe the functionality that they want to implement, perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

In logic design and functional verification (step 114) the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

In synthesis and design for test (step 116) the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

In netlist verification (step 118) the netlist is checked for compliance with timing constraints and for correspondence with the VHDL/Verilog source code. Example EDA software products from Synopsys, Inc. that can be used at this step include Formality, PrimeTime, and VCS products.

In design planning (step 120) an overall floor plan for the chip is constructed and analyzed for timing and top-level routing. Example EDA software products from Synopsys, Inc. that can be used at this step include Astro and Custom Designer products.

In physical implementation (step 122) the placement (positioning of circuit elements) and routing (connection of the same) occurs. Example EDA software products from Synopsys, Inc. that can be used at this step include the Astro, IC Compiler, and Custom Designer products. Aspects of the invention can be performed during this step 122.

In analysis and extraction (step 124) the circuit function is verified at a transistor level, this in turn permits what-if refinement. Example EDA software products from Synopsys, Inc. that can be used at this step include AstroRail, PrimeRail, PrimeTime, and Star-RCXT products.

In physical verification (step 126) various checking functions are performed to ensure correctness for: manufacturing, electrical issues, lithographic issues, and circuitry. Example EDA software products from Synopsys, Inc. that can be used at this step include the Hercules product. Aspects of the invention can be performed during this step 126 as well.

In tape-out (step 127) the "tape-out" data is used (after lithographic enhancements are applied if appropriate) for production of masks for lithographic use to produce finished chips. Example EDA software products from Synopsys, Inc. that can be used at this step include the IC Compiler and Custom Designer families of products.

In resolution enhancement (step 128) geometric manipulations of the layout are used to improve manufacturability of the design. Example EDA software products from Synopsys, Inc. that can be used at this step include Proteus, ProteusAF, and PSMGen products.

In mask data preparation (step 130) mask-making-ready "tape-out" data for production of masks for lithographic is used to produce finished chips. Example EDA software products from Synopsys, Inc. that can be used at this step include the CATS® family of products. Often this step includes partitioning or fracturing non-rectangular shaped islands into rectangles. Overall, the EDA software process is able to provide a digital representation of a physical chip or portion of chip that is manufactured and/or produced.

While the above described EDA design flow is sufficient to allow the design of very complex systems on a chip (SoCs), it is noted that the number of the circuit paths in a chip that cross from one power domain to another may be larger than tens of millions. Each such path that crosses from one power domain to another is known in the art as a "crossover path" and in modern chip designs the number of such crossover paths is very large and growing.

To ensure there are no functional errors or functional violations in these crossover paths, one needs to identify these paths and traverse over several times. Such functional violations may be design and specification problems which can cause malfunction of the semiconductor device due to a mismatch in power domain states.

Figure 2:
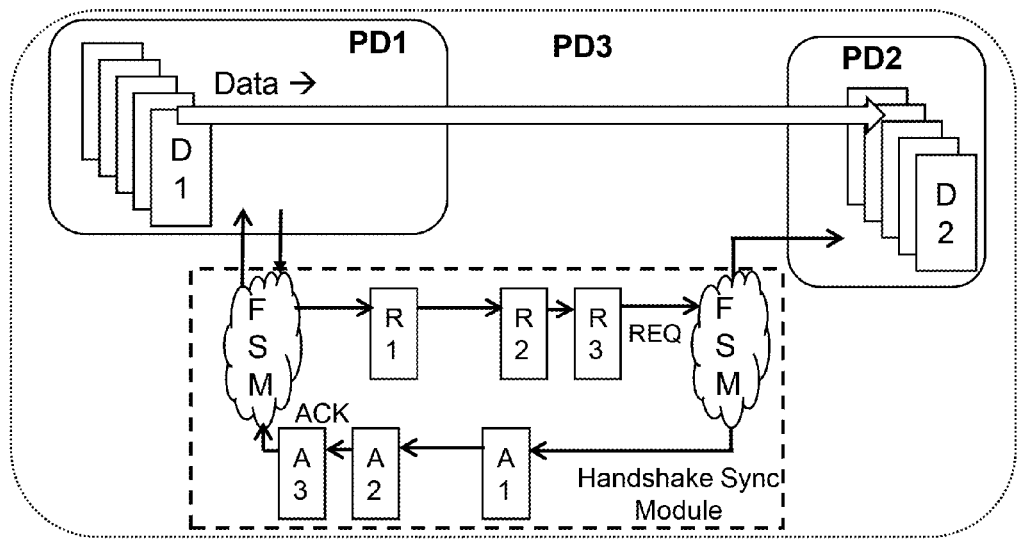
FIG. 2 is a simplified block diagram showing an example of a clock domain crossing synchronizer being distributed over various power domains.

Referring now to FIG. 2, an illustration of a circuit design that crosses over multiple power domains is shown. This for example includes a clock domain crossing synchronizer being distributed over the multiple power domains.

In particular, data are to be transported from a register D1 in a first circuit block arranged in a first power domain PD1 to a register D2 in a second circuit block in a second power domain PD2. The data transmission is synchronized by a handshake sync module being located in a third power domain PD3. The handshake sync module comprises several finite state machines FSM and intermediate elements R1, R2, R3 and A1, A2, A3 for requesting and acknowledging the handshake.

If all power domains PD1, PD2, PD3 are switched on, a synchronization is working correctly as expected. If, for example, only the first power domain PD1 is switched on and the other power domains PD2, PD3 are switched off, no data transmission to the second circuit block, respectively the register D2 is possible. Hence, the handshake sync module being switched off is not a problem in this configuration. However, if both the first and the second power domain PD1, PD2 are switched on and only the third power domain PD3 is switched off, no valid clock domain crossing synchronization is possible, rendering the synchronizer, namely the handshake sync module, as invalid during a functional evaluation.

Figure 3:
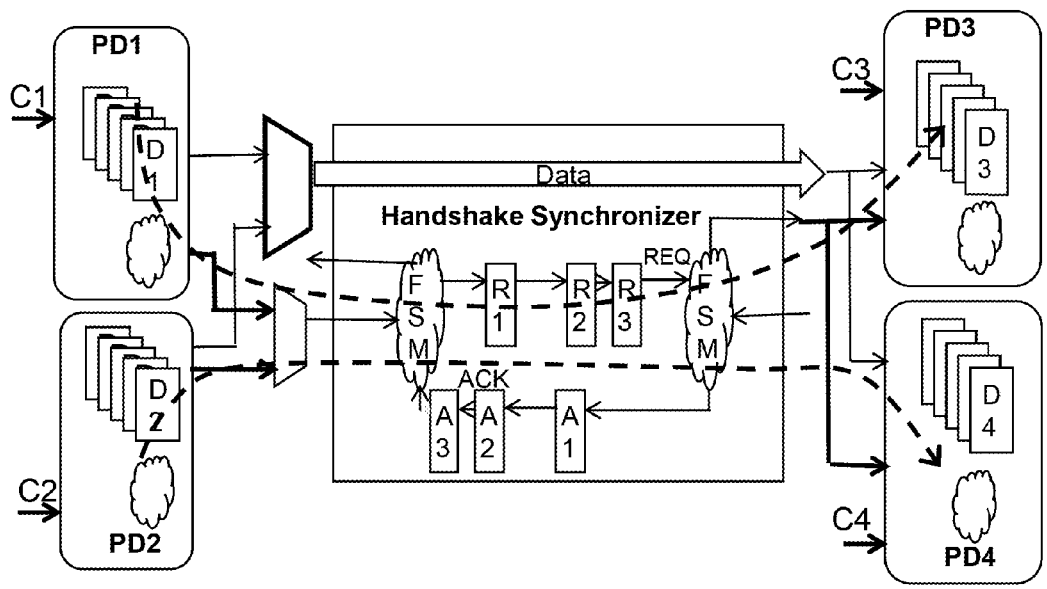
FIG. 3 is a simplified block diagram showing a further example of clock domain crossing paths being distributed over various power domains.

Referring now to FIG. 3, a further illustration of a circuit design crossing over multiple power domains is shown. In this design four circuit blocks in respective four power domains PD1, PD2, PD3, PD4 are provided. Each of the circuit blocks operates with a respective clock signal C1, C2, C3, C4. A handshake synchronizer, similar to the handshake sync module of FIG. 2, is provided between the first two power domains PD1, PD2 and the second two power domains PD3, PD4. Respective multiplexers for multiplexing data and synchronization signals from the power domains PD1, PD2 to the handshake synchronizer are provided.

Based on the circuit representation shown in FIG. 3, four structurally possible clock domain crossing paths are present, namely from register D1 to register D3, from register D1 to register D4, from register D2 to register D3 and from register D2 to register D4. However, the underlying power design description, for example according to the unified power format, UPF, or the common power format, CPF, may determine that during operation of the intended circuit only power domains PD1 and PD3 or power domains PD2 and PD4 may be switched on at the same time. Hence, although structurally present, the paths from D1 to D4 and from D2 to D3 are non-functional. Therefore, only the paths from D1 to D3 and the paths from D2 to D4 are functional crossover paths. As a consequence, verification for the invalid paths can be omitted in this example. In other words, this is an example how only a subset of possible paths (D1→D3 and D2→D4) are valid paths considering power state combinations.

The evaluation can be based on a clock domain crossing analysis, which determines whether the handshake synchronizer operates correctly in all valid power state combinations. Additionally, or as an alternative, a signal propagation time on the crossover paths, in particular the valid crossover paths, can be evaluated. In particular, a timing analysis can be performed analyzing whether a propagation time between a respective source node, e.g., in PD1 or PD2, and a destination node, e.g., in PD3 or PD4 is shorter than a predetermined time, in particular a clock period of the system.

Figure 4:
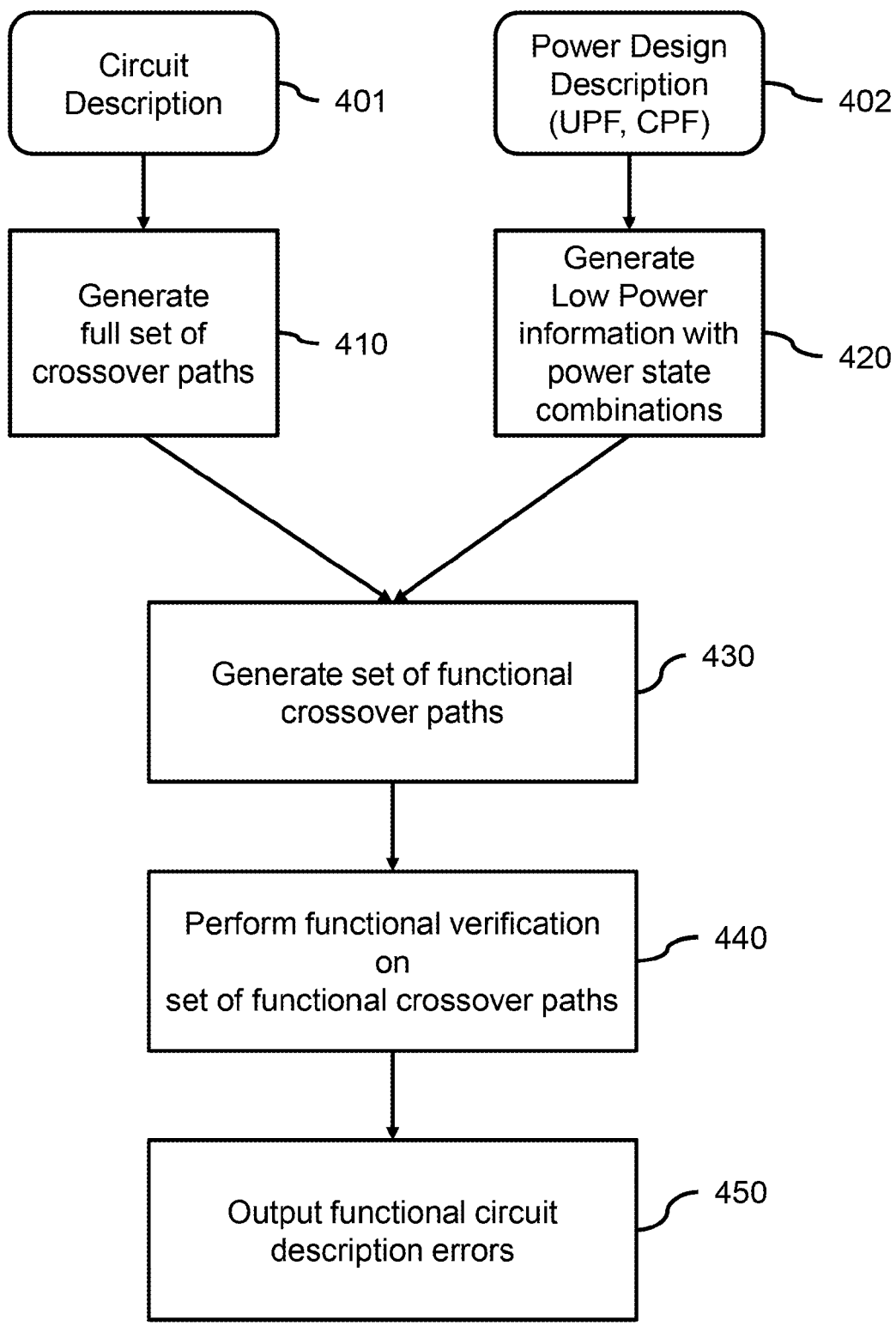
FIG. 4 is a flow chart showing steps in a low power verification method in accordance with an example embodiment.

FIG. 4 shows a flow chart of an example embodiment of a method for functional verification of a circuit description, which allows a minimization of evaluation steps. Such a method may be implemented in an EDA tool or the like. The method starts with the provision of a circuit description in block 401 and a power design description in block 402, e.g. a UPF or CPF description. The descriptions are, for example, provided from an external source or are already present in the EDA tool.

In block 410 the circuit description is evaluated in order to generate a full set of crossover paths, i.e. signal paths which cross over several domains, like clock domains, power domains or the like. The full set of crossover paths can also be called a first set of crossover paths. In block 420, which can be executed before, after or in parallel to block 410, a low power information is generated from the power design description, the low power information determining a set of power state combinations. The power design description further determines a set of available power domains in a representation of the circuit description. Hence, each element of the set of power state combinations determines an allowed combination of switching states of power domains belonging to the set or to a subset of the set of available power domains. Referring to the example of FIG. 3, a combination of power domains PD1, PD3 being switched on and PD2, PD4 being switched off, would be one element of the set of power state combinations.

In block 430, a functional set of crossover paths is generated based on the full set of crossover paths and the low power information, such that the set of functional crossover paths is a subset of the full set of crossover paths. For example, the functional set of crossover paths can be called a second set of crossover paths.

The generating step in block 430 is performed by excluding or including respective elements of the full set of crossover paths according to predefined rules being applied on the allowed combinations of switching states respectively power state combinations. For example, the second set is generated such that a crossover path from the first, full set is not included in the second set if a power domain comprising a root node or a sync node of the respective crossover path is switched off in any of the allowed combinations of switching states of power domains. Additionally, or as an alternative, the second set is generated such that a crossover path from the first set is included in the second set if a power domain comprising a root node of the respective crossover path and a power domain comprising a sink node of the crossover path are both switched on in at least one of the allowed combinations of switching states of power domains.

More generally speaking, the second set is generated such that all crossover paths of the second set are functional in at least one of the allowed combinations of switching states of power domains. Preferably, generating the second set of crossover paths is performed as a static analysis. For example, generating the second set of crossover paths is performed without simulation.

In block 440 a functional verification is performed on the set of functional crossover paths generated before. For example, the functional verification is performed by evaluating, for each path of the set of functional crossover paths, the circuit functions of selected circuit elements of the respective paths for at least of a selected plurality of circuit parameters, and identifying circuit description errors, in particular functional circuit description errors based on the evaluation. The identification of functional errors may comprise the provision of a set of rules and evaluating the circuit functions of the selected circuit elements to at least one of the rules in the set of rules for each of the plurality of circuit parameters. Such identified circuit description errors can be output in block 450.

Performing the functional verification in block 440 may be the identification of synchronization errors in a clock domain crossing analysis on the functional set of crossover paths, which may be clock domain crossover paths in such a case. This will be explained in more detail below in conjunction with FIG. 5.

Furthermore, the functional verification being performed in block 440 may also be a timing analysis of timing paths, thereby analyzing propagation times. This will be explained in more detail in conjunction with FIG. 6.

Figure 5:
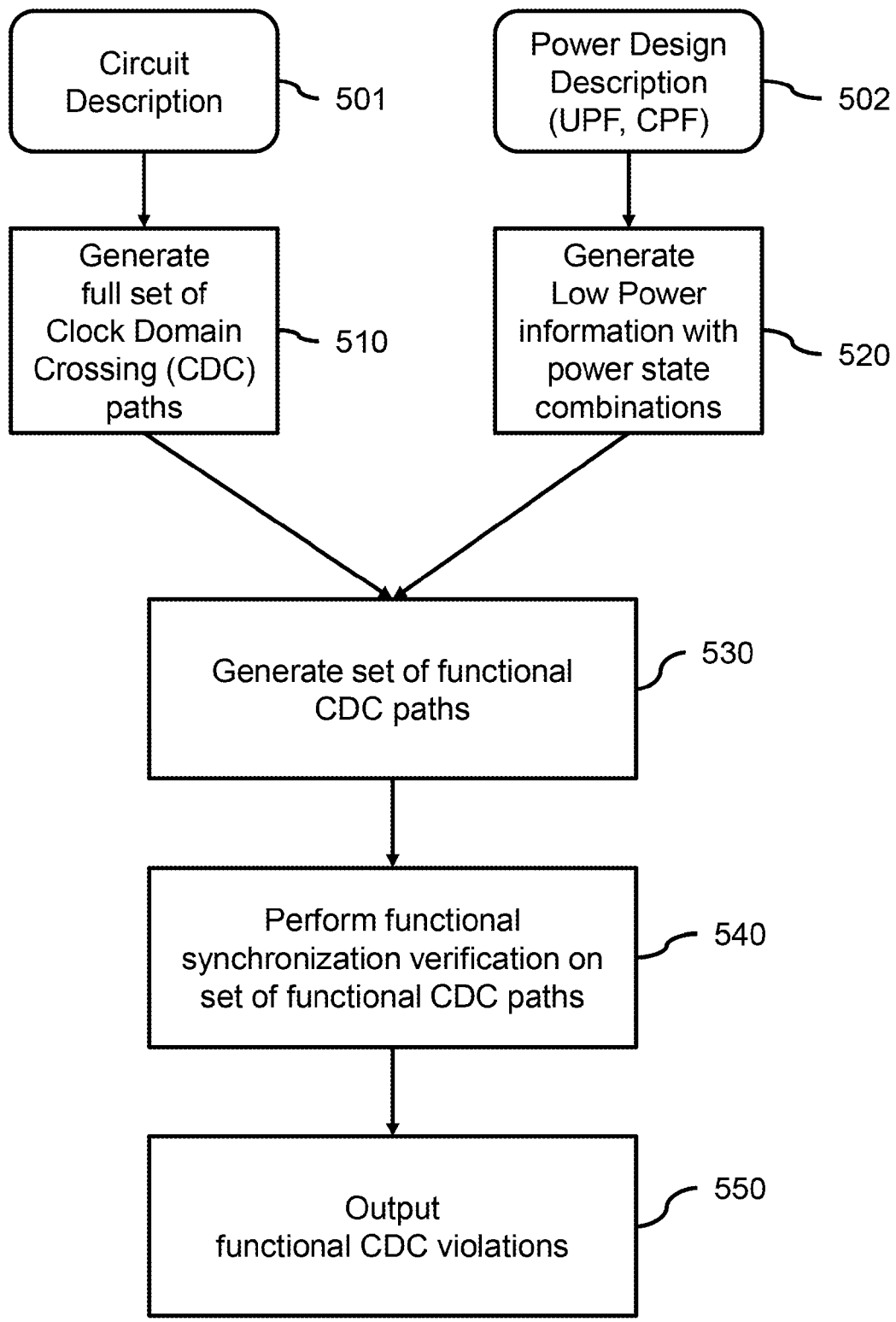
FIG. 5 is a flow chart showing steps in a low power verification method in accordance with a further example embodiment.

Now referring to FIG. 5, a flowchart of a functional verification method is shown, which is based on the general flowchart in FIG. 4. In particular, blocks 501, 502 and 520 correspond to respective blocks 401, 402 and 420, such that a detailed explanation of these blocks is omitted here.

In block 510, which is based on block 410, a full set of clock domain crossover paths is generated defining all possible paths that begin and end in different clock domains. In block 530, which is based on block 430, a set of functional clock domain crossover paths is generated, i.e. only those paths are part of the functional set which are not only structurally present but also functionally allowed by at least one allowed combination of switching states of power domains defined in the low power information. This e.g. may be done in a static analysis without simulation.

In block 540 a functional synchronization verification is performed on the set of functional clock domain crossover paths. For example, the verification comprises evaluating, for each of the set of functional clock domain crossover paths, whether each power domain comprising a clock synchronizing element between a root node and a sink node of the respective clock domain crossover path is switched on for each of the allowed combinations of switching states of power domains where the power domains comprising said root node and said sink node are both switched on.

For instance, referring to the example of FIG. 2, the handshake sync module would be marked as an illegal synchronizing element, if a combination of power domains PD1, PD2 being switched on and power domain PD3 being switched off, was an allowable power state combination. The results of the evaluation, for instance, the marking of a synchronizing element as illegal, can be output or displayed to a user in block 550.

Figure 6:
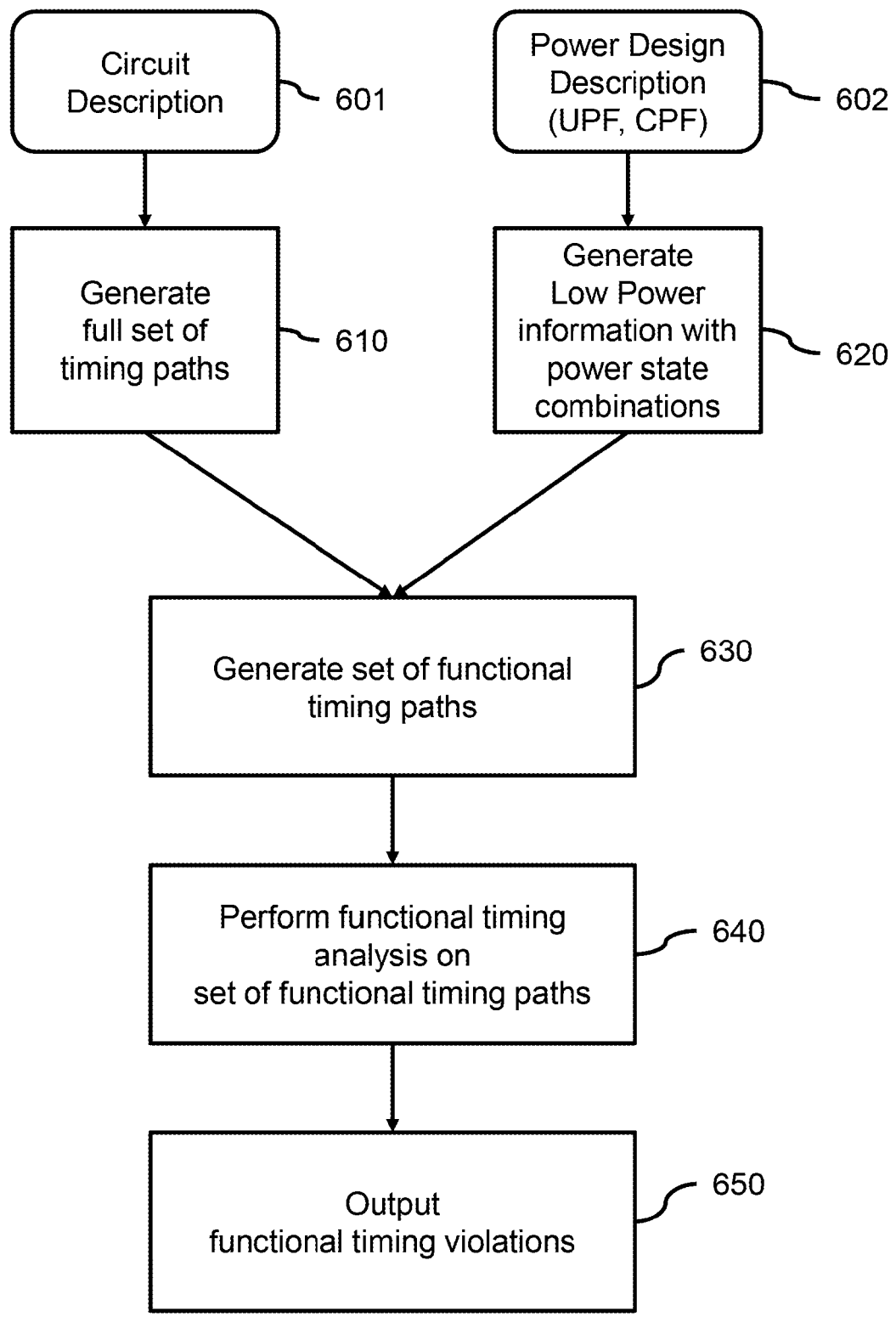
FIG. 6 is a flow chart showing steps in a low power verification method in accordance with a further example embodiment.

Referring now to FIG. 6, a further flowchart of an example implementation of a method for functional verification of a circuit description is shown. Also the flowchart of FIG. 6 is based on the flowchart of FIG. 4, in particular the blocks 601, 602 and 602 correspond to blocks 401, 402 and 420, a description of which is therefore omitted here.

In block 610 a full set of timing paths is generated. For example, a timing path defines a signal path from a source block to a destination block, with or without processing of the signal. Again, the functioning of such timing paths may be dependent on power states of the respective power domains which are crossed by the timing path.

Accordingly, in block 630 a set of functional timing paths is generated based on the full set of timing paths and the low power information with the power state combinations. This e.g. may be done in a static analysis without simulation.

In block 640, which is based on block 440, a functional timing analysis is performed on the set of functional timing paths. In particular, the evaluation performed in block 640 comprises a timing analysis for each of the set of functional timing paths that analyzes whether a propagation time between a source node of the respective timing path and the destination node of the respective timing path is shorter than a predetermined time for each of the allowed combinations of switching states of power domains. In this case, the power domains comprising said source node and said destination node are both switched on. For example, the predetermined time is equal to or derived from a clock period of a clock signal at said source node or said destination node or of a clock signal being present in a circuit according to the circuit description. If timing errors are found in the functional timing analysis, such errors may be output as functional timing violations in block 650, which generally is based on block 450.

Referring to the example shown in FIG. 3, such timing analysis may include to check whether a signal from register D1 in the first power domain PD1, driven by clock signal C1, reaches register D3 in power domain PD3 driven by clock signal C3, in particular within a clock period of clock signal C1 or clock signal C3, as D1 to D3 is a functional timing path. No test is performed, for example, on the structurally present timing path D1 to D4, which is not a functional timing path, according to the example described above.

The general scheme described in conjunction with FIG. 4 can be applied to other functional analysis of any crossover path. Furthermore, although the analysis in FIG. 5 and FIG. 6 are described separately, both a clock domain crossover path and a timing path analysis can be performed more or less in parallel, at least without the need to be performed completely separately.

The foregoing described embodiments of the invention are provided as illustrations and descriptions. They are not intended to limit the invention to the precise form described. In particular, it is contemplated that functional implementations of the invention described herein may be implemented equivalently in hardware, software, firmware, and/or other available functional components or building blocks, and that networks may be wired, wireless, or a combination of wired and wireless. Other variations and embodiments are possible in light of the above teachings.

What is claimed is:

1. A method for functional verification of a circuit description utilizing a power design description, the method comprising:
generating a first set of crossover paths based on the circuit description;
generating a low power information based on the power design description being associated with the circuit description, the low power information determining a set of power state combinations;

generating a second set of crossover paths based on the first set of crossover paths and the low power information, the second set of crossover paths being a subset of the first set of crossover paths; and evaluating each of the second set of crossover paths to identify functional circuit description errors.

2. The method of claim 1, wherein circuit elements of each crossover path are assigned to one of a set of available power domains being determined by the power design description, and wherein each element of the set of power state combinations determines an allowed combination of switching states of power domains belonging to the set or to a subset of the set of available power domains.

3. The method of claim 2, wherein the second set is generated such that a crossover path from the first set is not included in the second set if a power domain comprising a root node or a sink node of the respective crossover path is switched off in any of the allowed combinations of switching states of power domains.

4. The method of claim 2, wherein the second set is generated such that a crossover path from the first set is included in the second set if a power domain comprising a root node of the respective crossover path and a power domain comprising a sink node are both switched on in at least one of the allowed combinations of switching states of power domains.

5. The method of claim 2, wherein the second set is generated such that all crossover paths of the second set of crossover paths are functional in at least one of the allowed combinations of switching states of power domains.

6. The method of claim 2, wherein at least a portion of the crossover paths are clock domain crossing paths.

7. The method of claim 6, wherein the evaluating step comprises evaluating, for each of the second set of clock domain crossing paths, whether each power domain comprising a clock synchronizing element between a root node and a sink node of the respective clock domain crossing path is switched on for each of the allowed combinations of switching states of power domains where the power domains comprising said root node and said sink node both are switched on.

8. The method of claim 2, wherein at least a portion of the crossover paths are timing paths.

9. The method of claim 8, wherein the evaluating step comprises performing, for each of the second set of timing paths, a timing analysis analyzing whether a propagation time between a source node of the respective timing path and a destination node of the respective timing path is shorter than a predetermined time for each of the allowed combinations of switching states of power domains where the power domains comprising said source node and said destination node both are switched on.

10. The method of claim 9, wherein the predetermined time is equal to or derived from a clock period of a clock signal at said source node or at said destination node.

11. The method of claim 1, wherein the evaluating step comprises evaluating, for each of the second set of crossover paths, the circuit functions of selected circuit elements of the respective path for at least one of a selected plurality of circuit parameters, and identifying functional errors in the circuit description based on the evaluation.

12. The method of claim 11, wherein identifying functional errors comprises providing a set of rules and evaluating the circuit functions of the selected circuit elements to at least one of the rules in the set of rules for each of the plurality of circuit parameters.

13. The method of claim 1, further comprising displaying identified functional errors.

14. The method of claim 1, wherein generating the second set of crossover paths is performed as a static analysis.

15. The method of claim 1, wherein generating the second set of crossover paths is performed without simulation.

16. A software tool to perform functional verification of a circuit description to minimize a number of crossover paths by utilizing a power design description, the software tool comprising a non-transitory computer readable storage medium having instructions that when executed by a processor causes the processor to:

generate a first set of crossover paths based on the circuit description;

generate a low power information based on the power design description associated with the circuit description, the low power information determine a set of power state combinations;

generate a second set of crossover paths based on the first set of crossover paths and the low power information, the second set of crossover paths being a subset of the first set of crossover paths; and evaluate each of the second set of crossover paths to identify low power circuit description errors.

17. The software tool of claim 16, wherein the instructions cause the processor to assign circuit elements of each crossover path to one of a set of available power domains being determined by the power design description, and wherein the instructions cause the processor, for each element of the set of power state combinations, to determine an allowed combination of switching states of power domains belonging to the set or to a subset of the set of available power domains.

18. The software tool of claim 17, wherein the instructions cause the processor to generate the second set such that a crossover path from the first set is not included in the second set if a power domain comprising a root node or a sink node of the respective crossover path is switched off in any of the allowed combinations of switching states of power domains.

19. The software tool of claim 17, wherein the instructions cause the processor to generate the second set such that a crossover path from the first set is included in the second set if a power domain comprising a root node of the respective crossover path and a power domain comprising a sink node are both switched on in at least one of the allowed combinations of switching states of power domains.

20. The software tool of claim 17, wherein the instructions cause the processor to generate the second set such that all crossover paths of the second set of crossover paths are functional in at least one of the allowed combinations of switching states of power domains.

21. The software tool of claim 17, wherein at least a portion of the crossover paths are clock domain crossing paths.

22. The software tool of claim 21, wherein the instructions to cause the processor to evaluate further comprises instructions that cause the processor to evaluate, for each of the second set of clock domain crossing paths, whether each power domain comprising a clock synchronizing element between a root node and a sink node of the respective clock domain crossing path is switched on for each of the allowed combinations of switching states of power domains where the power domains comprising said root node and said sink node both are switched on.

23. The software tool of claim 17, wherein at least a portion of the crossover paths are timing paths.

24. The software tool of claim 23, wherein the instructions that cause the processor to evaluate further comprises instructions that cause the processor to perform, for each of the second set of timing paths, a timing analysis analyzing whether a propagation time between a source node of the respective timing path and a destination node of the respective timing path is shorter than a predetermined time for each of the allowed combinations of switching states of power domains where the power domains comprising said source node and said destination node both are switched on.

25. The software tool of claim 24, wherein the predetermined time is equal to or derived from a clock period of a clock signal at said source node or at said destination node.

26. The software tool of claim 16, wherein the instructions that cause the processor to evaluate further comprises instructions that cause the processor to evaluate, for each of the second set of crossover paths, the circuit functions of selected circuit elements of the respective path for at least one of a selected plurality of circuit parameters, and identifying functional errors in the circuit description based on the evaluation.

27. The software tool of claim 26, wherein the instructions that cause the process to identify functional errors further comprises instructions that cause the processor to provide a set of rules and evaluate the circuit functions of the selected circuit elements to at least one of the rules in the set of rules for each of the plurality of circuit parameters.

28. The software tool of claim 16, further comprising instructions that cause the processor to display identified functional errors.

29. The software tool of claim 16, wherein the instructions that cause the processor to generate the second set of crossover paths further comprises instructions to cause the processor to perform a static analysis.

30. The software tool of claim 16, wherein the instructions to cause the processor to generate the second set of crossover paths further comprises instructions that cause the processor to generate the second set of crossover paths without simulation.

* * * * *